US007239053B2

(12) United States Patent
Brill

(10) Patent No.: US 7,239,053 B2
(45) Date of Patent: Jul. 3, 2007

(54) VIBRATOR MOTOR

(75) Inventor: Edward D. Brill, Sterling, IL (US)

(73) Assignee: Wahl Clipper Corporation, Sterling, IL (US)

( * ) Notice: Subject to any disclaimer, the term of this patent is extended or adjusted under 35 U.S.C. 154(b) by 21 days.

(21) Appl. No.: 10/434,308

(22) Filed: May 8, 2003

(65) Prior Publication Data

US 2003/0192186 A1 Oct. 16, 2003

Related U.S. Application Data

(62) Division of application No. 09/855,989, filed on May 15, 2001.

(51) Int. Cl.
*H02K 33/00* (2006.01)
*B26B 19/02* (2006.01)

(52) U.S. Cl. ............................ 310/36; 310/37; 310/81; 30/210

(58) Field of Classification Search .................. 30/210; 310/29, 36–38, 46–48, 81
See application file for complete search history.

(56) References Cited

U.S. PATENT DOCUMENTS 1,547,193 A * 7/1925 Anderson .................... 30/210
1,833,191 A * 11/1931 Van Osdel ................... 30/210
1,891,486 A 12/1932 Wahl
2,249,057 A * 7/1941 Stahl .......................... 336/192
2,283,551 A 5/1942 Hanley
2,521,653 A * 9/1950 Ruud .......................... 310/37
2,699,509 A 1/1955 Lee et al.
2,877,364 A 3/1959 Wahl et al.
2,967,253 A 1/1961 Wahl
2,986,662 A 5/1961 Wahl
3,010,036 A * 11/1961 Wahl ........................... 30/210
3,354,417 A * 11/1967 Davis ......................... 336/198
3,357,101 A 12/1967 Davis
3,405,379 A * 10/1968 Wilson ....................... 336/192
3,436,574 A * 4/1969 Larsson ...................... 310/194
3,493,793 A * 2/1970 Niemela ...................... 310/37
3,570,122 A 3/1971 Williams
3,643,117 A 2/1972 Alger et al. .................. 310/30
3,735,297 A 5/1973 Pfenning .................... 335/203

(Continued)

FOREIGN PATENT DOCUMENTS

DE 28 26 419 12/1979

(Continued)

OTHER PUBLICATIONS

Wahl Clipper Model ACT (Two copies of color photographs are attached hereto as Exhibit A).

*Primary Examiner*—Jason Prone
(74) *Attorney, Agent, or Firm*—Greer, Burns & Crain, Ltd

(57) ABSTRACT

A vibrator motor has a stationary piece and a moving piece hinged at one end. The moving piece does not generate substantial internal spring forces under the influence of an electromagnetic field, because it does not have a tail bracket. Other parts of conventional motors are also eliminated, so the motor is easier and less expensive to manufacture. In addition, the motor can be assembled and tuned before installation, which increases the ability to automate assembly.

1 Claim, 7 Drawing Sheets

U.S. PATENT DOCUMENTS

| | | | | | |
|---|---|---|---|---|---|
| 3,749,951 | A | * | 7/1973 | Artin et al. | 310/73 |
| 3,800,172 | A | | 3/1974 | Artin et al. | |
| 3,812,389 | A | * | 5/1974 | Bowerman | 30/210 |
| 3,840,760 | A | | 10/1974 | de Boer | 310/36 |
| 3,846,603 | A | * | 11/1974 | Houser | 200/458 |
| 3,906,263 | A | | 9/1975 | Chen | 310/29 |
| 3,931,554 | A | | 1/1976 | Spentzas | |
| 3,946,486 | A | * | 3/1976 | Locke et al. | 310/47 |
| 3,962,783 | A | * | 6/1976 | Rentema | 30/223 |
| 3,970,978 | A | | 7/1976 | Langree | 335/203 |
| 4,157,519 | A | * | 6/1979 | Foster | 336/192 |
| 4,160,177 | A | | 7/1979 | Ascoli | 310/22 |
| 4,221,049 | A | | 9/1980 | Hamashima | |
| 4,392,092 | A | | 7/1983 | Gassner | |
| 4,414,963 | A | * | 11/1983 | Kunz | 601/85 |
| 4,617,543 | A | * | 10/1986 | Akachi et al. | 336/192 |
| 5,565,833 | A | * | 10/1996 | Leet et al. | 335/250 |
| 5,771,538 | A | | 6/1998 | Huppert, Sr. | 16/274 |
| 5,787,587 | A | | 8/1998 | Wahl et al. | 30/210 |
| 5,922,379 | A | | 7/1999 | Wang | |
| 6,121,697 | A | | 9/2000 | Soultanian | 310/36 |
| 6,163,092 | A | | 12/2000 | Soultanian | 310/15 |
| 6,314,648 | B1 | | 11/2001 | Hillebrandt | |
| 6,421,922 | B2 | | 7/2002 | Beutel et al. | 30/210 |
| 6,493,905 | B2 | | 12/2002 | Stettler | |
| 6,559,563 | B1 | * | 5/2003 | Shimizu et al. | 30/74 |
| 6,590,990 | B2 | * | 7/2003 | Abe et al. | 381/407 |
| 6,596,215 | B2 | * | 7/2003 | Mayumi et al. | 264/263 |
| 6,598,824 | B2 | * | 7/2003 | Schmidt | 242/603 |
| 2003/0094861 | A1 | * | 5/2003 | Shimizu et al. | 310/36 |

FOREIGN PATENT DOCUMENTS

| | | |
|---|---|---|
| DE | 198 50 966 | 7/2000 |
| EP | 116 869 | 8/1984 |
| EP | 0 802 614 | 10/1997 |
| EP | 802 614 | 10/1997 |
| FR | 1496637 | 10/1966 |
| GB | 501957 | 3/1939 |
| GB | 594770 | 11/1947 |
| GB | 724978 | 2/1955 |
| GB | 868934 | 7/1957 |
| GB | 797649 | 7/1958 |
| JP | 62-16502 | 1/1987 |
| JP | 2000-124028 | 4/2000 |
| NL | 8801697 | 2/1990 |
| WO | 0027599 | 5/2000 |

* cited by examiner

VIBRATOR MOTOR

This is a divisional of application Ser. No. 09/855,989, filed May 15, 2001.

This invention relates to vibrator motors, and more particularly to vibrator motors for hair clippers and the like that have fewer parts than conventional vibrator motors, and can be installed in a case after the motor is assembled.

BACKGROUND OF THE INVENTION

Vibrator motors are available in a variety of configurations. Typically, the motor includes a stack of stationary laminations secured inside a case for a hair clipper or other device. A coil wrapped around the stationary laminations produces varying electromagnetic fields that drive a complimentary set of moving laminations.

The moving laminations are typically secured in an appropriate location with respect to the stationary laminations using a spring-like tail bracket. At least one, and usually two or three, pole faces are formed where the stationary and moving laminations are close to each other. One end of the tail bracket is secured to an end of the moving laminations, and the other end of the tail bracket is secured to the housing or the stationary laminations. The tail bracket/moving laminations assembly forms an arm of sorts that is attached at one end and open at the other. The open end of the moving laminations reciprocates to drive a clipper blade or some other device.

In addition to the tail bracket, conventional vibrator motors also have a mechanical spring system that allows the motor to be tuned to a proper resonant frequency so that it operates properly. The spring system also determines the position of the moving laminations and clipper blades when the coil is not energized. A typical spring system has two coil springs. When the coil is energized by alternating current, the tail bracket, the spring system and the electromagnetic fields generated by the coil make the clipper blade or other device reciprocate. Motor tuning is accomplished by adjusting the stiffness of the springs in the spring system to obtain good performance, usually by turning an appropriate screw which adjusts the tension in the springs. If not properly tuned the motor will not have sufficient power, or it will flutter or clatter and essentially operate in an uncontrolled manner or not operate at all.

Many things affect tuning, including the weight of the moving parts, the weight of the stationary parts, the length of the moving part of the arm, the energy release rate of the tuning springs, the alignment of the pole faces, the stiffness of the tail bracket, and other factors. Variations in any of these aspects of the device can cause problems in operation, and problems in manufacturing and assembly.

Variations in the tail bracket present particularly difficult manufacturing challenges. If the tail bracket material thickness or hardness varies even slightly, the resonant frequency (the speed at which the arm vibrates naturally) is affected, since the force required to move the arm is related to the stiffness of the tail bracket. Even variations in bends in the tail bracket can cause assembly problems, because they can make the motor untunable.

The tail bracket acts as a secondary tuning spring in addition to the two coil type tuning springs. If the neutral unsprung position of the tail bracket in the assembly is not the same as the neutral position of the arm when the clipper has been tuned, the tail bracket works against one of the tuning springs, applying a heavier load to one of the tuning springs than to the other. This causes the resonant frequency to change, since the spring load changes in order to compensate for the bias load applied by the tail bracket. Moreover, the force required to move the arm also varies under these conditions. Variations in tail bracket bends also affect the orientation of the blades, and in some cases make it difficult to properly align the blades of hair clippers.

Another problem with known vibrator motors is that they require several pieces that must be assembled together in the case. The case is usually molded from plastic, which can have substantial dimensional variation due to warping and dimensional variation inherent in the molding process. These variations can create manufacturing and assembly problems.

Dimensional variations of the pieces assembled in the case can create additional manufacturing and assembly problems. For example, if the drive finger is the wrong length, it can cause tuning problems due to the change in resonant frequency caused by a change in the length of the arm. In hair clippers, a drive finger that is too long can make it impossible to align the tips of the bottom blade teeth with the tips of the top blade teeth so that they have the correct overlap distance. If the drive finger is crooked, it can cause a crooked appearance of the top blade. If the drive finger is too far to the right or left, the teeth of the bottom blade might not be able to be adjusted to line up with the top blade teeth, causing a loss of cutting performance.

Dimensional variations can also cause misalignment of the pole faces of the stationary and moving laminations. If there is excessive variation in the case, and/or in the arm assembly, the pole faces of the arm laminations will not be aligned with the pole faces of the coil laminations. There can be a vertical misalignment or the laminations can be twisted such that there may be a larger gap between poles near the top than at the bottom, or vice versa. Also, one of the poles may be closer together than the other poles. In any of these cases, the motor will not operate as efficiently as if the poles were well aligned, because the magnetic gap will be larger than it should be at some place, resulting in loss of power and/or efficiency or higher than normal power consumption.

These problems can occur when one part, such as the case, is out of tolerance, or when the parts are individually within acceptable tolerances, but the cumulative variations from desired specifications is unacceptably high. Tolerance accumulation problems are often difficult to identify and resolve, particularly where the number of parts is high.

In some conventional motors, the tuning springs are located at the rear or bottom of the motor, away from the drive end of the arm. This can also cause tuning problems, because the springs have poor leverage.

In all, conventional motors have a relatively high number of parts which make them expensive and difficult to manufacture and assemble. Automation is also difficult because the designs are fairly complicated. Accordingly, there is a need for vibrator motors that are easier to manufacture and assemble, and are more adaptable to automated manufacture and assembly.

Accordingly, one object of this invention is to provide new and improved vibrator motors.

Another object is to provide new and improved vibrator motors for hair clippers and the like.

Another object is to provide new and improved vibrator motors that are less expensive and easier to manufacture and assemble than conventional motors.

Yet another object is to provide new and improved vibrator motors that do not have a tail bracket or the problems associated with tail brackets just discussed. A still further object is to provide new and improved vibrator motors that are less susceptible to parts tolerance build-up.

Still another object is to provide new and improved vibrator motors having fewer parts than conventional motors.

Still another object is to provide new and improved vibrator motors that can be pre-assembled and installed in a case after assembly.

SUMMARY OF THE INVENTION

In keeping with one aspect of this invention, a vibrator motor has a stationary piece and a moving piece. One end of the moving piece is hinged to an end of the stationary piece. The pieces are open at the other end, where complementary pole faces on the stationary and moving pieces are separated from each other by at least one predetermined variable gap. Another gap is typically provided near the hinge, and other gaps may be provided, if desired.

A coil is wound around a bobbin on the stationary piece. When the coil is energized with alternating current, it generates magnetic flux that flows through the stationary piece and the moving piece. The flux crosses the gap just above the hinge, as well as the gap at the other end of the motor pieces.

A bias spring system plays the primary role in establishing the size of the gap between the stationary and moving pieces, and the resonant frequency of the motor during operation. The bias on the spring system can be adjusted to obtain an acceptable gap and resonant frequency. An extension on the bobbin and a drive member on the moving piece provide support for the spring system.

The open vibrating end of the moving piece has sufficient power to drive a device such as the moving blade of a hair clipper or the like. The entire motor can be assembled and installed in a case as a single unit. In fact, the motor can even be tested and tuned outside of the case, before installation, if desired.

The moving piece is hinged directly to the stationary piece without a tail bracket, and the moving piece does not generate substantial internal spring forces under the influence of the magnetic field. The tail bracket and other parts of conventional motors are eliminated entirely, and the motor is less expensive to manufacture. It is also easier to manufacture and assemble because it has fewer parts, less cumulative tolerance among parts, and a simpler system for establishing the resonant frequency. In addition, the motor can be assembled and tuned before installation, which increases the ability to automate assembly.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
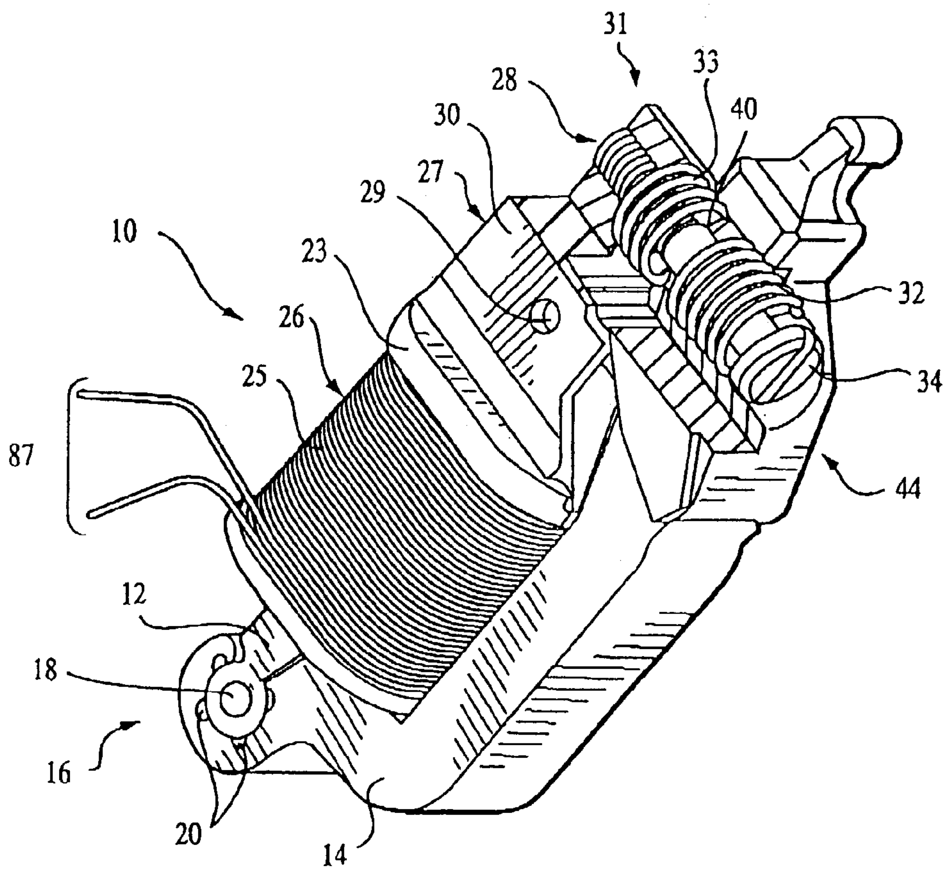
FIG. 1 is a partially cutaway perspective view of a vibrator motor made in accordance with the principles of this invention.
Figure 2:
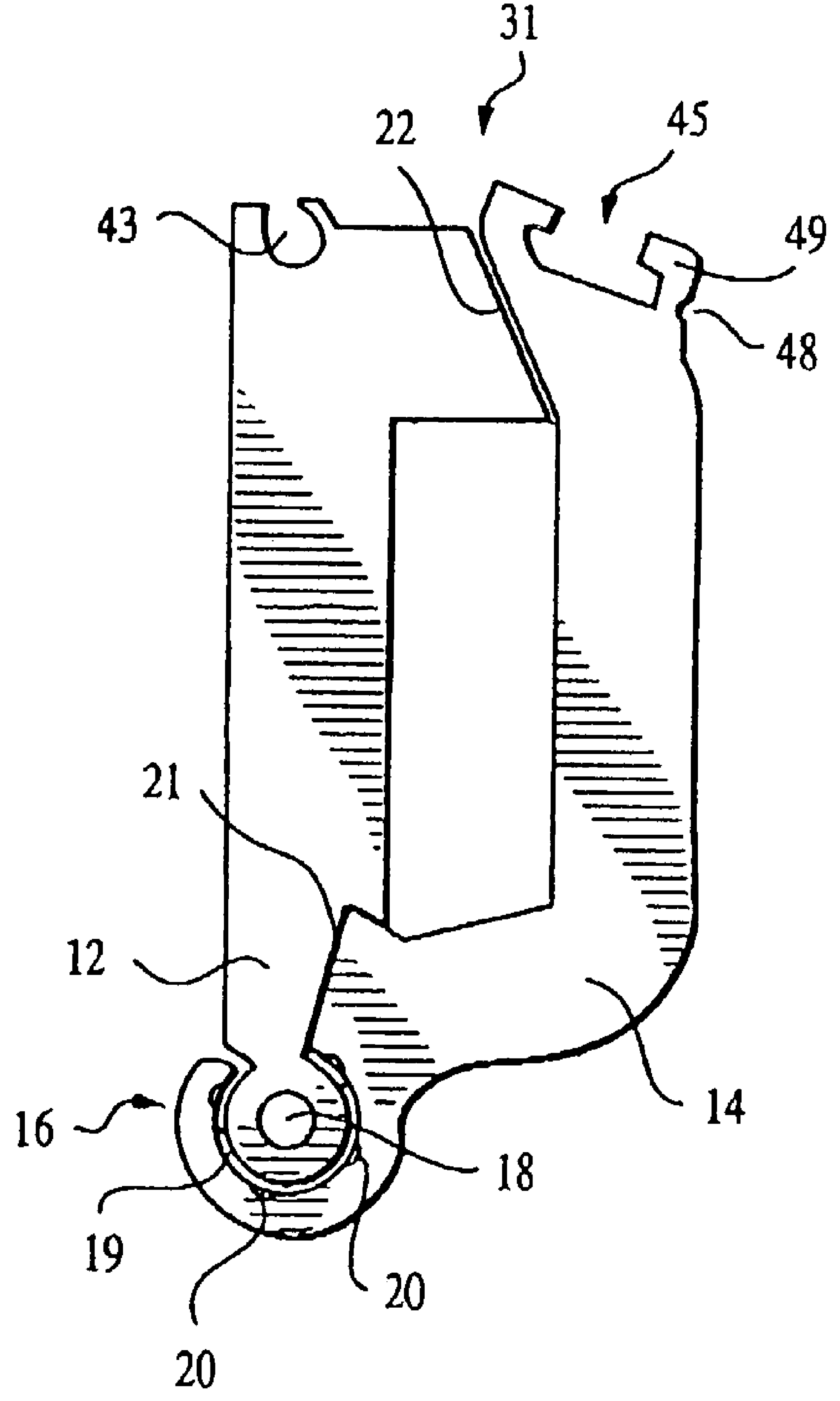
FIG. 2 is a plan view of the stationary and moving pieces used in the motor of FIG. 1.

As seen in FIGS. 1 and 2, a vibrator motor 10 includes a stationary piece 12 and a moving piece 14. The pieces 12, 14 can be made of a plurality of stacked laminations, or solid material.

The stationary piece 12 and the moving piece 14 form a hinge 16 at one end. Hinging can be accomplished in many ways. In FIGS. 1 and 2, the hinge end of the stationary piece 12 is circular on an outer surface, like a hinge pin, with an opening 18 for an installation screw, as will be seen. The hinge end of the moving piece 14 is curved on an inside surface to at least partially surround the curved portion of the stationary piece 12 and form a hinge barrel. Preferably, clearance between the pieces in the hinge is as minimal as possible, while still allowing the moving piece 14 to rotate in operation.

The hinge 16 may be lined with plastic 19 (FIG. 2) or any other suitable low friction material, if desired, to reduce wear and dissipate heat, if desired. Grease slots 20 may be provided in the moving piece 14, as in FIG. 1, or in the stationary piece 12. Though not shown, it is contemplated that the hinge 16 could also be made by providing the moving piece 14 with a hinge pin and the stationary piece 12 with a hinge barrel.

When assembled, the motor 10 has two gaps 21, 22 (FIG. 2) between the stationary piece 12 and the moving piece 14. While the embodiment shown in FIGS. 1 and 2 has a generally L shaped stationary piece and two gaps, other configurations are possible, such as a C shape with two gaps, an E shape with three gaps, etc. The surfaces that form the gaps 21, 22 are pole faces. Preferably, the pole faces of the gap 21 form a plane that generally intersects the axis of the opening 18.

Figure 3:
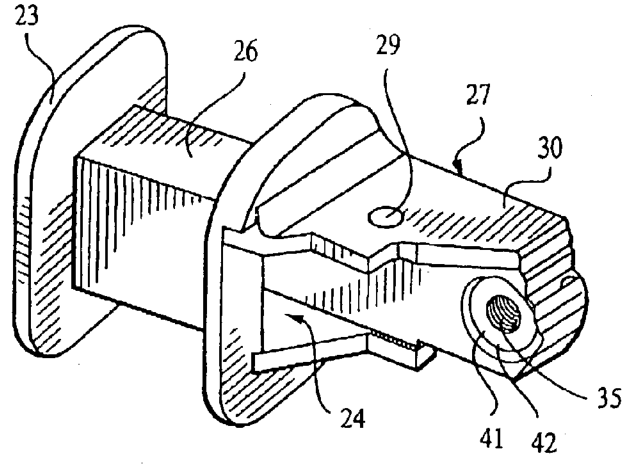
FIGS. 3, 4 and 5 are perspective views of a coil bobbin used in the motor of FIG. 1, with FIG. 5 showing the stationary piece installed in the bobbin.
Figure 4:
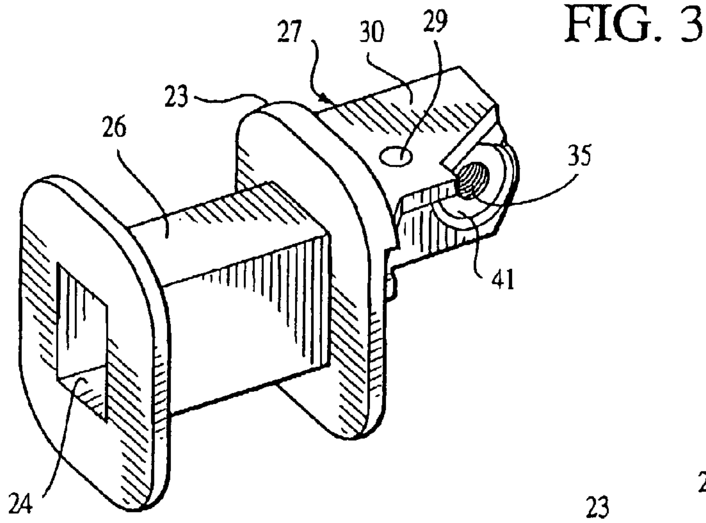
Figure 5:
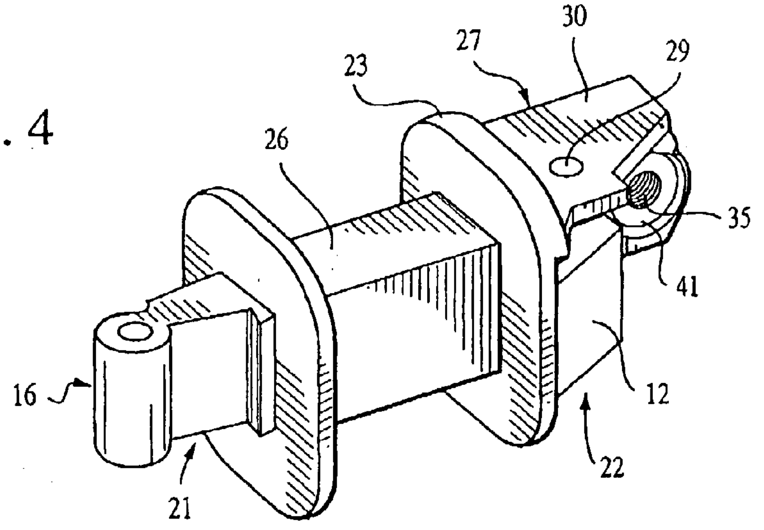

The motor 10 also includes a coil bobbin 23 (FIG. 3) having an opening 24 (FIG. 4) that allows the bobbin 23 to be placed around the stationary piece 12 by slipping the bobbin over the hinge end 16 of the stationary piece 12, as seen in FIG. 5. A coil 25 (FIG. 1) is wound around a winding portion 26 of the bobbin 23, preferably before installation. In some products, such as massagers, the coil can be wound around the moving piece instead of the stationary piece.

The bobbin 23 also has an arm 27 used to support a movement control device such as a spring system 28 (FIG. 1). A screw hole 29 is also provided for motor installation purposes. The screw hole 29 preferably goes through a bobbin gusset 30, adding rigidity to the arm when assembled in the case. The bobbin 23 can be made in many ways, but is preferably molded in the one piece configuration shown in FIG. 1.

The spring system 28 (FIG. 1) is located toward an open end 31 of the stationary piece 12 and the moving piece 14. The spring system 28 determines the position of the moving piece 14, and plays a part in determining the resonant frequency of the moving piece 14 and the amplitude of its vibrations during operations. The spring system 28 includes a first spring 32, a second spring 33, and an adjusting screw 34 that threadedly engages an opening 35 in the bobbin 23. The screw 34 preferably has a chamfer 36 (FIG. 9) that limits lateral movement of the spring 32, and a groove 37 in a wall 38 also limits lateral movement of the spring 32. Lateral movement of the spring 33 is limited by a groove 39 in a wall 40 and a groove or indentation 41 in a wall 42.

Figure 6:
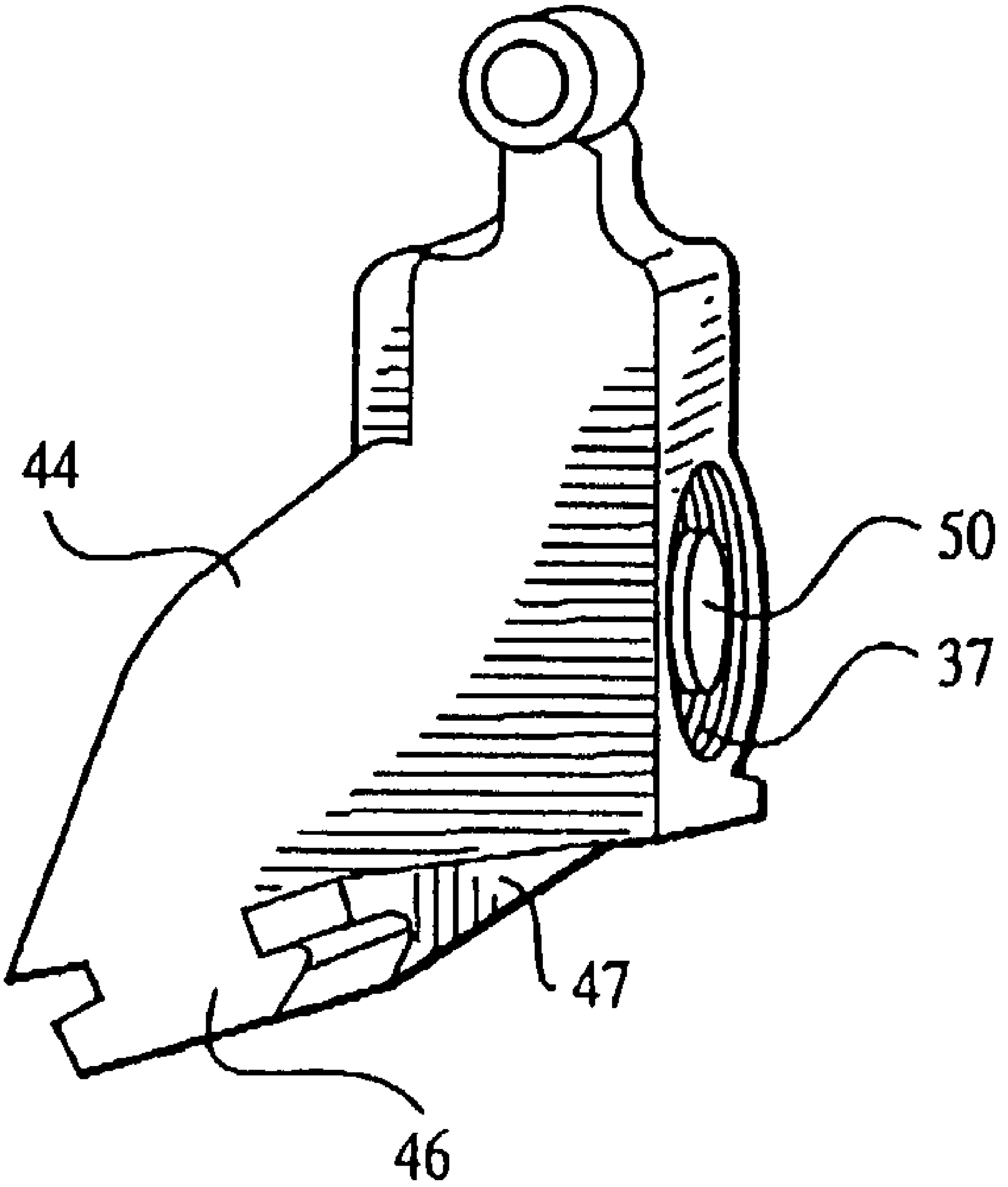
FIG. 6 is a perspective view of a drive member used in the motor of FIG. 1.

The end of the stationary piece 12 at the open end 31 has an opening 43 that aligns with the opening 29 in the bobbin 23 for installation purposes. The end of the moving piece 14 at the open end 31 is configured to accept and secure a drive member 44 (FIG. 6). Using a C shaped end configuration 45 shown in FIG. 2, and a T shaped end configuration 46 for the drive member 44, as shown in FIG. 6, the drive member can be easily secured to the open or moving end of the piece 14 by slipping the end 46 into end 45 up to a side wall 47. A notch 48 (FIG. 2) facilitates bending or crimping of an end 49 of the moving piece 14, to more tightly secure the drive member 44 to the moving piece 14 after installation. It is also contemplated that the drive member 44 and the moving piece 14 could be fabricated as one piece. In any event, the drive member is on the moving piece.

The screw 34 (FIG. 1) passes through an opening 50 (FIG. 6) in the drive member 44. The spring 32 (FIG. 1) is held under tension between the head of the screw 34 and the wall 38 of the drive member 44. Tension is maintained in the spring 33 by the wall 40 in the drive member 44 and the wall 42 in the arm 27 of the bobbin 23. The arm 27 is threaded to secure the screw 34 in place, while allowing easy adjustment of the screw 34 for tuning purposes.

Figure 7:
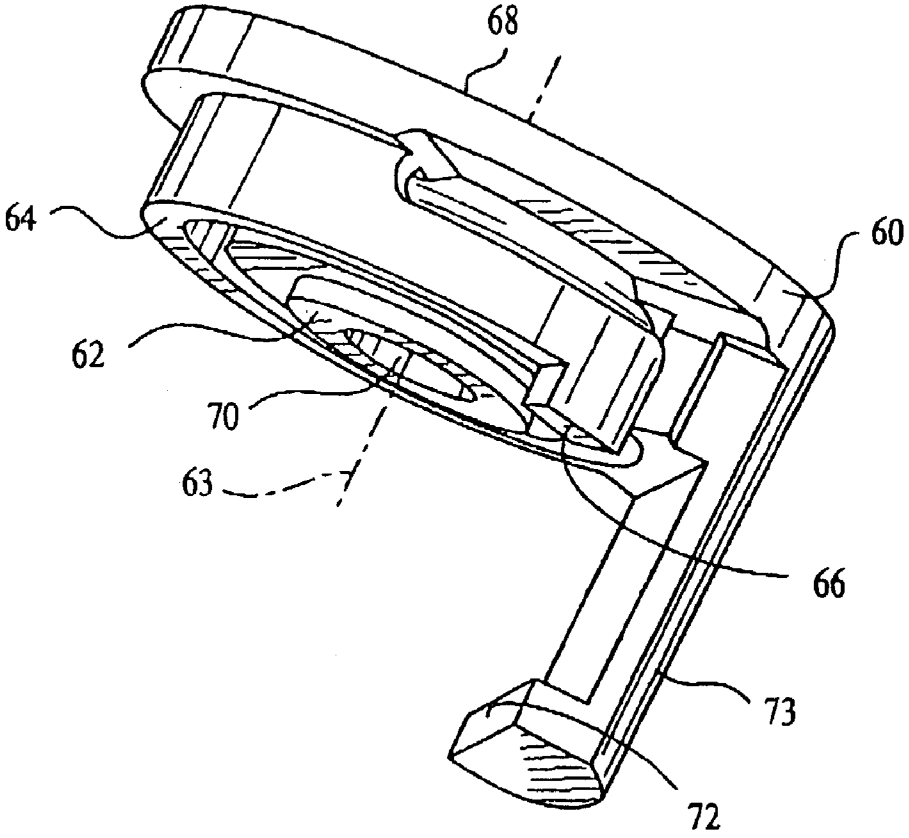
FIG. 7 is a perspective view of a hinge holder for the motor of FIG. 1.
Figure 8:
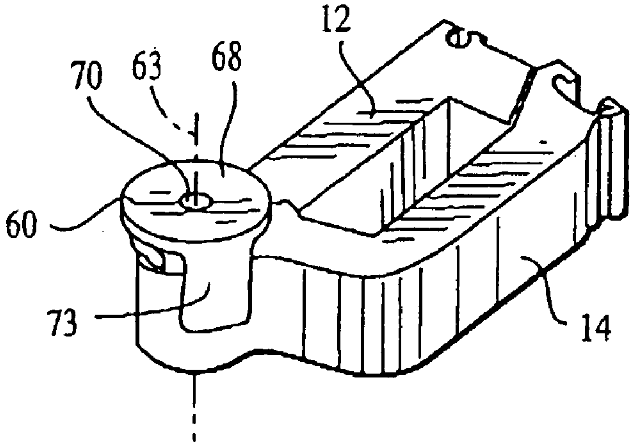
FIG. 8 is a perspective view of the pieces of FIG. 2, showing the moving piece retained to the stationary piece by the holder of FIG. 7.

The moving piece 14 can be secured with respect to the stationary piece 12 at the hinge 16 in any suitable way, such as a screw and a washer, or a screw and a holder 60, shown in FIGS. 7 and 8. The holder 60 has a bottom surface 62 that rests on the stationary piece 12 surrounding the opening 18 to secure the stationary piece 12 axially with respect to an axis 63, a second surface 64 having a surface 66 on a flexible, resilient finger that holds the moving piece 14 down and in proper alignment with the stationary piece 12, and a top surface 68 by which the holder 60 can be held in place. By allowing the surface 66 to function independently of the surface 62, the hinge holder 60 can be tightened axially as much as desired, without inhibiting rotation of the moving piece 14.

The device 60 also includes a second surface 72 on another spring finger 73 that places lateral or radial pressure on the moving piece 14, to stabilize the moving piece 14 during operation by eliminating excessive chatter in the hinge. The surface 72 preferably presses against the moving piece 14, as shown.

Figure 9:
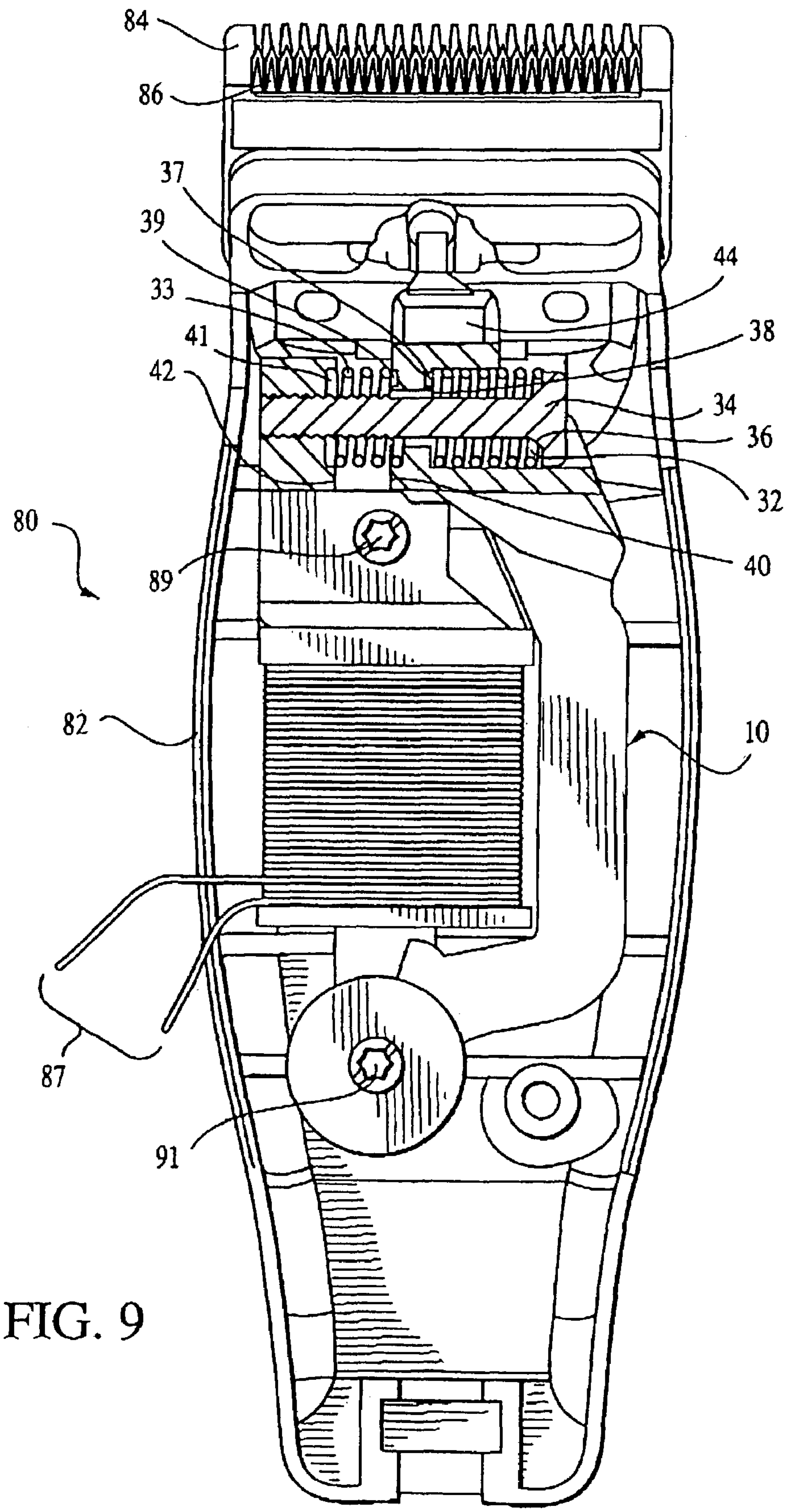
FIG. 9 is a plan view of the motor of FIG. 1 installed in a hair clipper.

The motor 10 is shown installed in a hair clipper 80 in FIG. 9. In addition to the motor 10, the hair clipper 80 includes a case 82, a fixed, detachable or adjustable stationary blade 84, and a moving blade 86 positioned opposite the blade 84 and appropriately secured, as in U.S. Pat. No. 5,068,966, entitled "Blade Assembly For Electric Hair Clippers", incorporated by reference in its entirety. The moving blade 86 is operatively connected to the drive member 44. A power switch and power source are typically connected to wires 87 of the motor 10, as well, and a cover (not shown) encloses the case 82.

Figure 10:
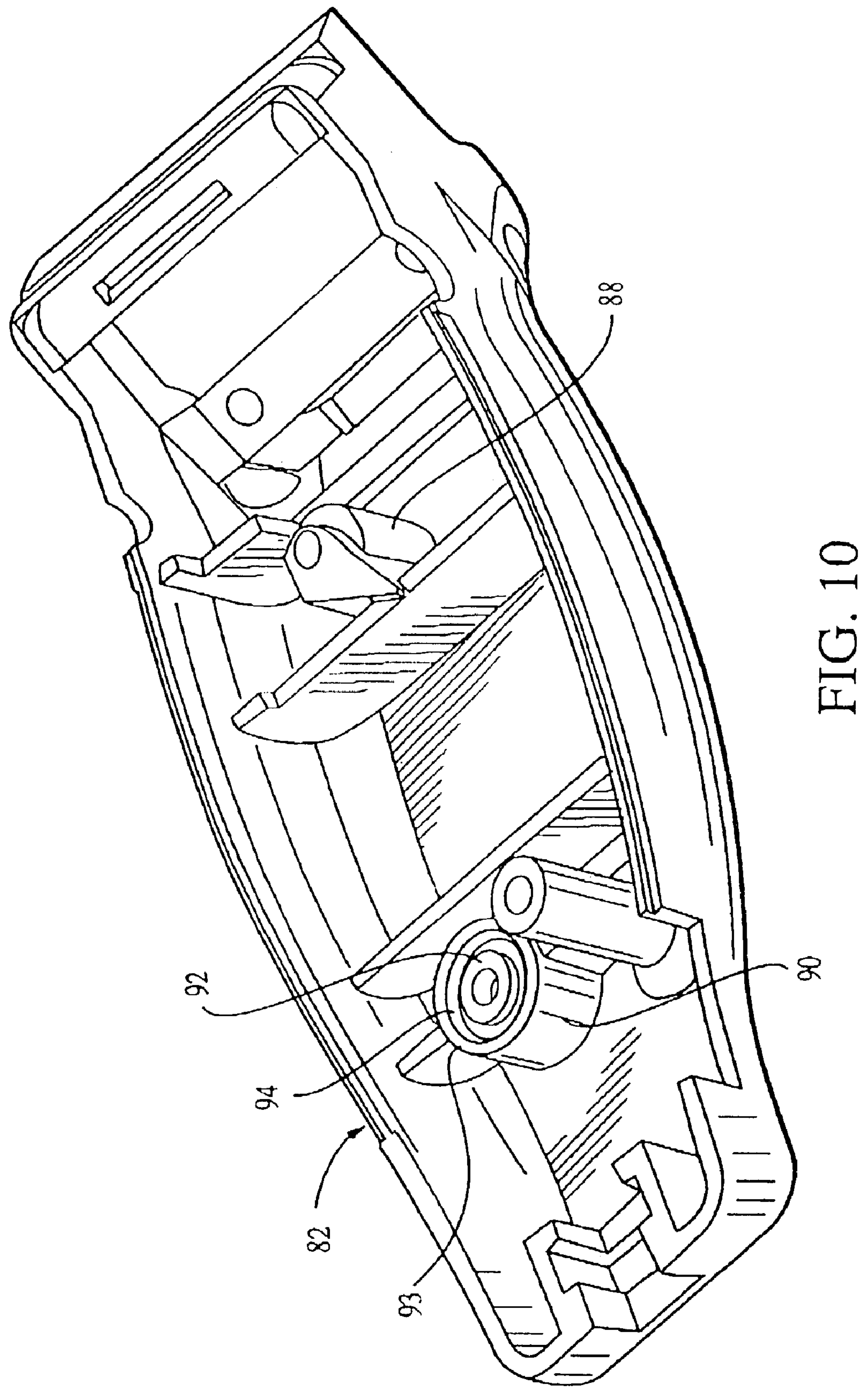
FIG. 10 is a perspective view of the case of the hair clipper of FIG. 9.

The case 82 (FIG. 10) is typically molded plastic, and includes a first threaded boss 88 for an installation screw 89, and a second threaded boss 90 for an installation screw 91. The boss 90 has an inner rim 92 and an outer rim 93, the rims 92, 93 being separated by a space 94. The outer rim 93 is a bearing surface for the moving piece 14. The outer rim 93 can be lowered to accept a washer, ball bearing, etc., if desired. The screw 91 presses the stationary piece against the rim 92, without placing pressure on the moving piece. In this manner, motor operation is not affected by the torque placed on the screw 91.

The motor 10 can be easily pre-assembled and installed in the case 82 as a single unit by placing the assembled motor in the case such that the drive member 44 is operatively connected to the moving blade 86, and securing the motor with screws 89, 91. The screws 89, 91 are secured in threaded openings in the case 82. While the motor 10 may be tuned before installation in the case 82, if desired, it can also be tuned after installation.

The hair clipper 80 can be easily manufactured by securing the stationery blade 84 to the case, usually by screws, and placing the moving blade 86 adjacent the blade 84, usually using a spring that allows the blade 86 to reciprocate to cut hair. The motor 10 is then installed in the case 80 using screws 89, 91, with the drive member 44 engaging the moving blade 86. A cover is then placed over the case 80 and secured.

While the motor of this invention has been described with respect to a hair clipper, many other applications are contemplated, such as shavers, engravers, electric scissors, air pumps, sprayers, massagers and any other device that can operate with a vibrator motor. In products such as massagers, the moving piece can vibrate openly, without a driver.

While the principles of the invention have been described above in connection with specific apparatus and applications, it is to be understood that this description is made only by way of example and not as a limitation on the scope of the invention.

What is claimed is:

1. A vibrator motor for personal care products comprising a stationary piece, a moving piece secured with respect to the stationary piece at one end for hinged movement therebetween, means for controlling the amount of movement of the moving piece relative to the stationary piece at an opposite end of the stationary and moving pieces, means for adjusting the controlling means, and a one-piece bobbin, the bobbin having a winding portion for wrapping wire around the bobbin, the winding portion having an internal opening through which the stationary piece can be inserted; and an arm integral with and extending from the winding portion so that the winding portion and arm are of one-piece construction, and a part of said adjusting means being secured to said arm.

* * * * *